United States Patent [19]

Hartmann

[11] Patent Number: 4,986,556

[45] Date of Patent: Jan. 22, 1991

[54] CHAINLESS MOTOCROSS BICYCLE

[76] Inventor: Dirck T. Hartmann, 4121 Morning Star Dr., Huntington Beach, Calif. 92649

[21] Appl. No.: 419,480

[22] Filed: Oct. 10, 1989

[51] Int. Cl.[5] ............................ B62M 1/08; F16H 1/28
[52] U.S. Cl. .................................... 280/260; 74/594.2; 475/293
[58] Field of Search ............... 280/259, 260; 74/594.2; 475/293, 312

[56] References Cited

U.S. PATENT DOCUMENTS

| | | | |
|---|---|---|---|
| 2,505,464 | 4/1950 | Debuit | 280/260 |
| 4,694,708 | 9/1987 | Hartmann | 280/260 X |
| 4,706,982 | 11/1987 | Hartmann | 280/260 X |
| 4,715,246 | 12/1987 | Hartmann | 280/260 X |
| 4,721,015 | 1/1988 | Hartmann | 280/260 X |

*Primary Examiner*—Charles A. Marmor
*Assistant Examiner*—Mitchell Bompey

[57] ABSTRACT

A chainless motocross bicycle features a bicycle frame with no bottom bracket or seat post, a pedal drive shaft located on the axis of the rear wheel, and a single speed planetary transmission located inside the rear wheel hub. The transmission includes a ring gear with an integral extension of the ring gear clamped in the bicycle frame dropout on the right side; multiple planet gears rotatably mounted on a planet gear carrier driven by the pedal drive shaft, with each planet gear in constant mesh with the ring gear and with a sun gear rotatably mounted on the pedal drive shaft; and a conventional one way clutch coupling the sun gear with the wheel hub. The compact nature, low maintenance, and simplicity of this arrangement provides an attractive alternative to chain driven motocross bicycles which are conventionally ridden with the rider standing on the pedals.

3 Claims, 2 Drawing Sheets

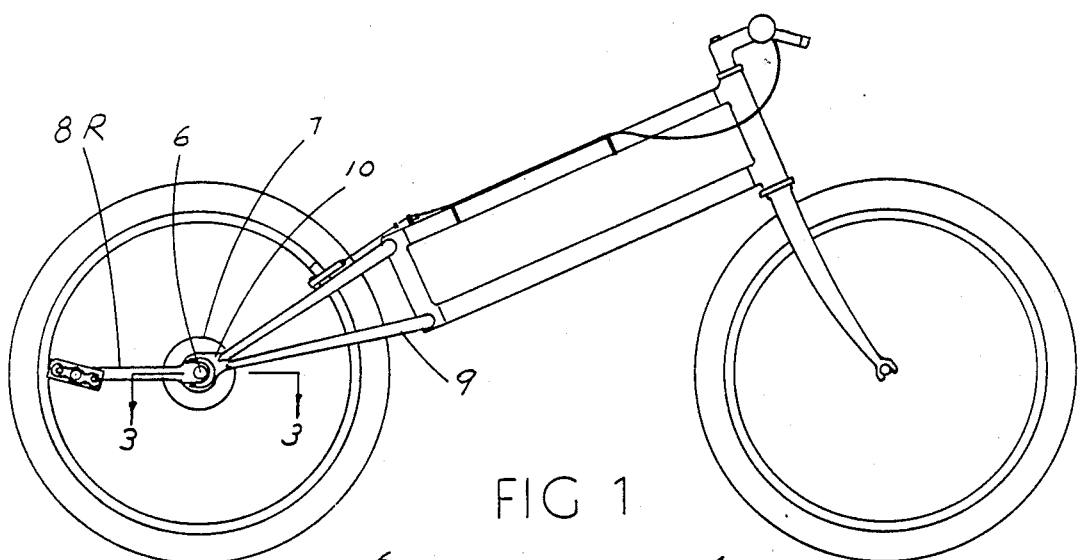
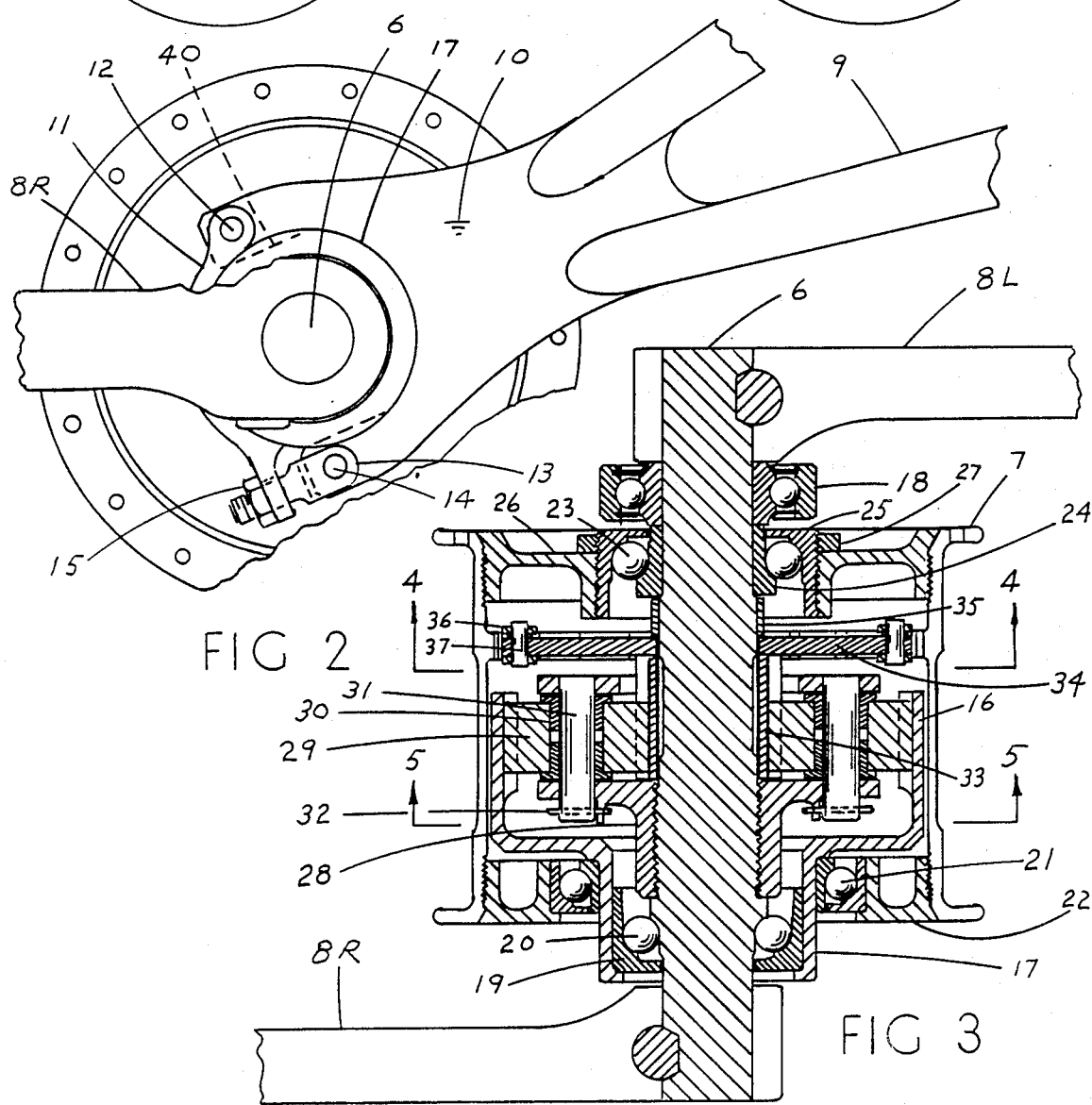

CHAINLESS MOTOCROSS BICYCLE

BACKGROUND OF THE INVENTION

1. Field of the Invention

This invention relates generally to frame configurations for bicycles and particularly to chainless bicycle drive mechanisms of the planetary transmission type.

2. Description of the Prior Art

Motocross bicycles commonly use a conventional bicycle frame with a bottom bracket and crankset driving a large forward sprocket coupled by a chain to a smaller sprocket driving the rear wheel. Since these bicycles are ridden extensively on dirt tracks, chain maintenance is particularly troublesome, and the bicycle seat is of little use during a race or in training.

An object of the present invention is to include a simple, low maintenance chainless drive in a compact light weight frame for motocross bicycles to encourage training and competition of young athletes, and to promote exercise and enjoyment for the young at heart of all ages.

SUMMARY OF THE INVENTION

The chainless motocross bicycle in accordance with the present invention includes a modified bicycle frame with two parallel tubular frame members connecting a conventional head tube with a short orthogonal tube located forward of the rear wheel; a pair of tubular truss members connecting opposite ends of the orthogonal tube with dropouts on either side of the rear wheel; and a cap link and clevis bolt pinned to opposite sides of each of the rear dropouts for clamping the rear wheel assembly in the frame.

The rear wheel assembly includes a pedal drive shaft located on the axis of the rear wheel and a single speed planetary transmission housed inside the rear wheel hub. The transmission includes a ring gear with an integral cylindrical extension of the ring gear clamped in the frame dropout on the right side by the cap link and clevis bolt. The outer race of a conventional crank set ball bearing is press fit inside the ring gear extension and supports the pedal drive shaft on the right side. The inner race of an angular contact ball bearing is seated outside the ring gear extension and the outer race of this bearing is press fit inside a wheel hub closing plate threaded into the end of the wheel hub for support of the wheel on the right side.

A planet gear carrier is threaded on the pedal drive shaft with right hand threads with the outboard end of the planet gear carrier seated against a shoulder on the pedal drive shaft located inside the ring gear extension. Four planet gears in constant mesh with the ring gear are rotatably mounted on the planet gear carrier with a pair of oil filled sintered bronze bushings press fit in each of the planet gears seated on a polished pin captive in the planet gear carrier.

A sun gear rotating freely on the pedal drive shaft is in constant mesh with each of the planet gears. A clutch plate welded on the left end of the sun gear outboard of the planet gear carrier drives the wheel hub through conventional spring loaded dogs on the clutch plate engaging ratchet teeth on the wheel hub.

The inner race of an angular contact ball bearing supporting the wheel hub on the left side is seated against a second shoulder on the pedal drive shaft and the outer race of this bearing is threaded inside a closing plate rigidly fastened inside the wheel hub on the left side. The threaded outer race is used to adjust the preload of all three angular contact ball bearings and the preload is secured with a lock nut threaded against the hub closing plate on the left side.

A sealed ball bearing is seated on the pedal drive shaft just inboard of the left side pedal crank arm and the outer race of this ball bearing is clamped inside the dropout by the cap link and clevis bolt on the left side.

BRIEF DESCRIPTION OF THE DRAWINGS

FIG. 1 is a side elevational view of a chainless motocross bicycle with a single speed planetary transmission located inside the hub of the rear wheel according to the present invention;

FIG. 2 is an enlarged partial view of the wheel hub looking from the right side;

FIG. 3 is an enlarged sectional view taken along the line 3—3 of FIG. 1;

DESCRIPTION OF THE PREFERRED EMBODIMENT

Figure 4:
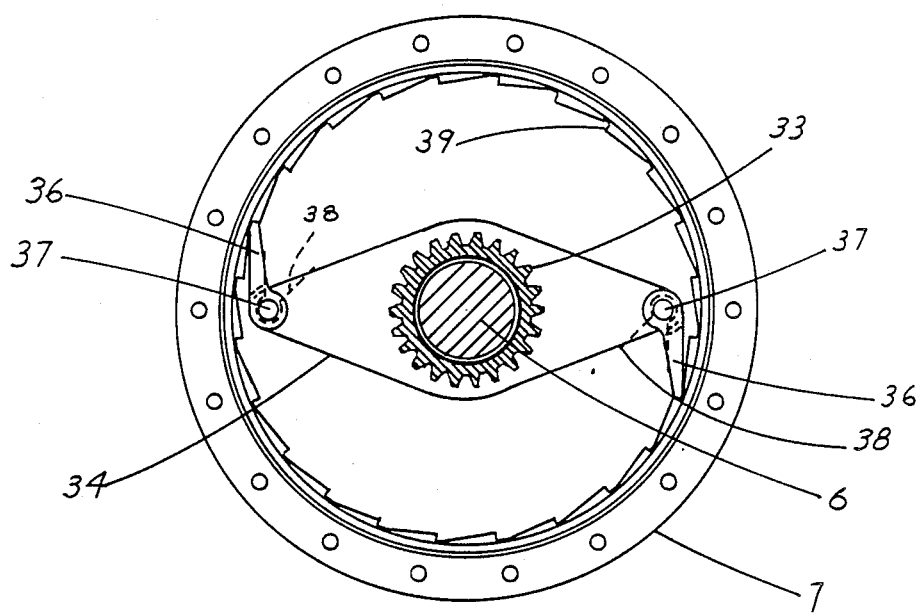
FIG. 4 is a sectional view taken along the line 4—4 of FIG. 3.

Referring to FIG. 2, a cap link 11, which is rotatably mounted on a pin 12, and a clevis bolt 13, which is rotatably mounted on a pin 14, clamp ring gear extension 17 in the dropout 10 using the nut 15. Milled flats 40 on the ring gear extension 17 engage matching flats on the dropout 10 and prevent the ring gear from rotating. When the nut 15 is backed off slightly, the clevis bolt 13 can be rotated out of a slot in the cap link 11 allowing the cap link to be rotated open. An identical cap link and clevis bolt clamp the bearing 18 (shown in FIG. 3) in the frame dropout on the left side. When the cap links on both sides are rotated open, the wheel assembly can be removed from the bicycle frame as a complete unit.

Referring to FIG. 3, left and right pedal crank arms 8L and 8R are rigidly fastened on the ends of a pedal drive shaft 6 by conventional means. A bearing race 19 is press fit inside the ring gear extension 17 and engages conventional crank set angular contact ball bearings 20 supporting the end of the drive shaft 6 on the right side. The inner race of an angular contact ball bearing 21 is press fit outside the ring gear extension 17, and the outer race of the bearing 21 is press fit inside a wheel hub closing plate 22 which is threaded into the end of the wheel hub 7 on the right side.

Figure 5:
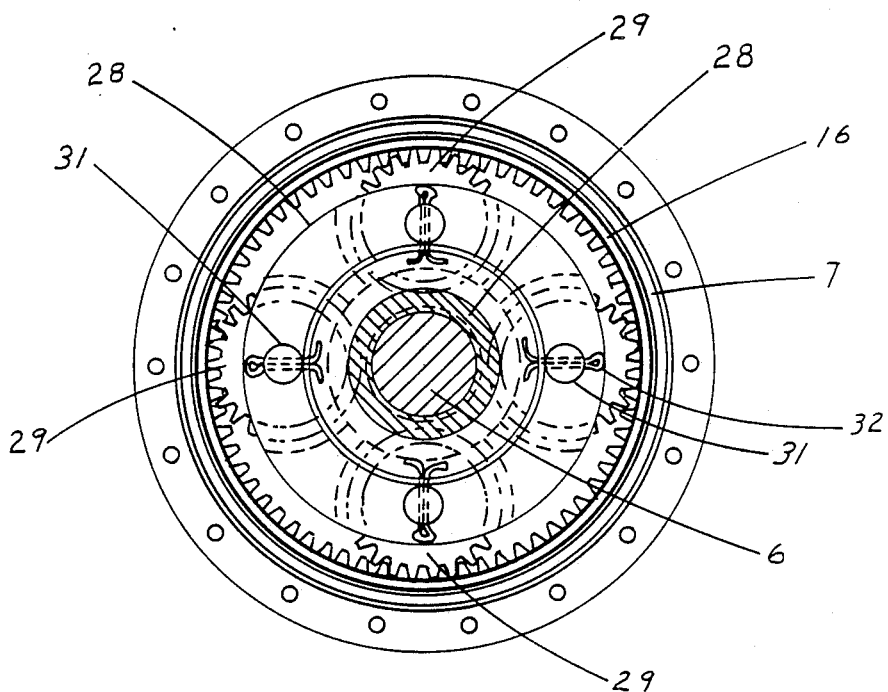
FIG. 5 is a sectional view taken along the line 5—5 of FIG. 3.

A planet gear carrier 28 is threaded on the drive shaft 6 with right hand threads and engages a shoulder on the drive shaft 6 located just inboard of the bearing 20. Four planet gears 29 (shown also in FIG. 5) are rotatably mounted in the carrier 28 with oil filled sintered bronze bushings 30 press fit in the planet gears 29, engaging polished pins 31 held captive in holes through the carrier 28 by cotter pins 32. The planet gears 29 are in constant mesh with a ring gear 16 and a sun gear 33 which is rotatably mounted on the drive shaft 6. A clutch plate 34 is welded on the end of the sun gear 33 and clutch dogs 36 are rotatably mounted on pins 37 press fit in the clutch plate 34 with the clutch plate 34 inserted into a notch milled in the clutch dogs. As shown in FIG. 4, a spring 38 is located inside the notch milled in each clutch dog and holds the clutch dog in engagement with the conventional ratchet teeth 39 integrally machined in the wheel hub 7, when the transmission is driving the wheel.

As shown in FIG. 3, the inner race 24 of an angular contact ball bearing 23 is seated against a shoulder on the drive shaft 6, and the outer race of the bearing 23 is threaded inside a closing plate 26 which is threaded in the end of the wheel hub 7 on the left side. The outer race 25 is used to adjust the axial preload of the angular contact ball bearings 20, 21, and 23 and the preload is secured with a locknut 27. The axial position of the sun gear/clutch plate assembly is constrained by the planet gear carrier 28 on the right end, and by a spacer 35 installed between the bearing race 24 and the clutch plate 34 on the left end.

In the example design developed to illustrate the present invention, 24 pitch involute gears are used with 22 teeth on the sun gear and each of the planet gears, and 66 teeth on the ring gear with a resultant pitch diameter for the ring gear of 2.75 inches and a transmission gear ratio of four turns of the wheel for each turn of the pedals.

While this invention has been described in terms of a preferred embodiment, it is anticipated that persons reading the preceding descriptions and studying the drawings may realize a number of possible modifications thereof. It is therefore intended that the following appended claims be interpreted as including all such modifications and alterations as fall within the true scope and spirit of the present invention.

I claim:

1. An improved chainless motocross bicycle including a frame said frame connecting a head tube for a conventional front fork assembly with dropouts on either side of a rear wheel with a central hub; a pedal drive shaft on the axis of said wheel for concentric rotation therewith; pedal crank arms fixed on opposite ends of said pedal drive shaft outboard of said dropouts; a single ring gear located within said hub with a reduced diameter integral extension of said ring gear extending outboard of said hub; a clamping means for locking said ring gear extension in one of said dropouts; a first angular contact ball bearing located inside said ring gear extension and centering one end of said pedal drive shaft; a second angular contact ball bearing with an inner race of said second bearing seated outside said ring gear extension and an outer race of said second bearing seated inside a first closing plate fixed in one end of said of hub; a single planet gear carrier fixed on said pedal drive shaft for rotation therewith and located inside said ring gear; multiple planet gears rotatably mounted on said planet gear carrier with each of said multiple planet gears in constant mesh with said ring gear; a single sun gear rotatably mounted on said pedal drive shaft with said sun gear in constant mesh with each of said multiple planet gears; a one way clutch means for driving said hub from said sun gear; a frame interface ball bearing centering the other end of said pedal drive shaft with said clamping means locking outer race of said frame interface bearing in an other of said dropouts; a second closing plate fixed in an other end of said hub; a third angular contact ball ball bearing with an inner race seated against a shoulder on said pedal drive shaft and an outer race threaded into said second hub closing plate for adjusting an axial preload of all three of said angular contact ball bearings; and a locknut threaded on said third bearing outer race and securing said axial preload.

2. An improved motocross bicycle according to claim 1 wherein said clamping means includes a cap link rotatably pinned to one side of each of said dropouts; a clevis bolt rotatably pinned to the other side of each of said dropouts; an open slot in said cap link for receiving said clevis bolt; and a nut on said clevis bolt for engaging said cap link.

3. An improved motocross bicycle according to claim 1 wherein said one way clutch means includes a clutch plate welded to one end of said sun gear; integral ratchet teeth on said hub; pins press fit in diametrically opposed positions on said clutch plate; diametrically opposed dogs rotatably mounted on said pins; and a spring holding each of said dogs in engagement with said ratchet teeth.

* * * * *